United States Patent
Sammons (10) Patent No.: US 9,802,516 B2
(45) Date of Patent: *Oct. 31, 2017

(54) VEHICLE SEAT STRAP RETAINING ASSEMBLY

(71) Applicant: Nissan North America, Inc., Franklin, TN (US)

(72) Inventor: Justin Sammons, Southgate, MI (US)

(73) Assignee: Nissan North America, Inc., Franklin, TN (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/010,660

(22) Filed: Jan. 29, 2016

(65) Prior Publication Data

US 2017/0217338 A1 Aug. 3, 2017

(51) Int. Cl.
| | |
|---|---|
| *A47C 1/08* | (2006.01) |
| *B60N 2/28* | (2006.01) |
| *B60N 2/44* | (2006.01) |
| *B60N 2/64* | (2006.01) |
| *B60N 2/48* | (2006.01) |

(52) U.S. Cl.
CPC ............. *B60N 2/2809* (2013.01); *B60N 2/28* (2013.01); *B60N 2/44* (2013.01); *B60N 2/48* (2013.01); *B60N 2/64* (2013.01)

(58) Field of Classification Search
CPC ...... A47C 1/08; A47D 1/103; B64D 11/0612; B61D 33/0092; B60N 2/2866; B60N 2/28; B60N 2/2809
USPC ...................... 297/250.1, 254, 256, 255, 253
See application file for complete search history.

(56) References Cited

U.S. PATENT DOCUMENTS

| | | | | |
|---|---|---|---|---|
| 3,061,371 A | * | 10/1962 | Benoit | B60N 2/283 297/256 |
| 4,874,203 A | * | 10/1989 | Henley | A61G 5/00 297/250.1 |
| 5,845,768 A | * | 12/1998 | Simpson | B65D 71/0096 108/55.3 |
| 5,918,934 A | * | 7/1999 | Siegrist | B60N 2/2821 296/64 |
| 6,095,604 A | * | 8/2000 | Stack | B60N 2/2809 297/188.04 |
| 6,234,572 B1 | * | 5/2001 | Shiino | B60N 2/286 297/253 |
| 6,322,141 B1 | * | 11/2001 | Dutkievic | B60N 2/2893 24/662 |

(Continued)

*Primary Examiner* — Jose V Chen
(74) *Attorney, Agent, or Firm* — Global IP Counselors, LLP (57) ABSTRACT

A vehicle seat strap retaining assembly includes a seat cushion section, a seatback section, a strap retaining clip and a strap attachment structure. The seatback section is attached to the seat cushion, the seatback section having a passenger's back supporting surface and an upper end surface. The strap retaining clip is attached to a rear surface of the seatback section. The strap attachment structure is rigidly fixed to one of the seat cushion section and the seatback section beneath the upper end surface. The strap retaining clip and the strap attachment structure are positioned and configured such that with a child seat positioned on the seat cushion section, a securing strap of the child seat extending over the upper end surface of the seatback section passes through the strap retaining clip and attaches to the strap attachment structure.

18 Claims, 12 Drawing Sheets

(56) References Cited

U.S. PATENT DOCUMENTS

| | | | | |
|---|---|---|---|---|
| 6,390,345 B1 * | 5/2002 | Brown | ............... | A45C 3/00 190/110 |
| 6,517,154 B2 * | 2/2003 | Sawamoto | ............... | B60N 2/2809 296/68.1 |
| 6,554,357 B2 * | 4/2003 | Moffa | ............... | B60N 2/242 297/253 |
| 6,827,400 B2 * | 12/2004 | Menon | ............... | B60N 2/2809 297/236 |
| 7,390,064 B2 * | 6/2008 | Horton | ............... | B60N 2/2884 297/216.11 |
| 7,427,104 B2 * | 9/2008 | Nakhla | ............... | B60N 2/4879 297/250.1 |
| 7,431,339 B2 * | 10/2008 | Yamamoto | ............... | B60N 2/2809 280/801.1 |
| 7,517,017 B1 * | 4/2009 | Liberkowski | ............... | B60N 2/2827 297/188.04 |
| 7,552,969 B2 * | 6/2009 | Maciejczyk | ............... | B60N 2/2809 280/801.1 |
| 7,770,969 B2 * | 8/2010 | Boyle | ............... | B60N 2/2806 297/254 |
| 8,678,499 B2 * | 3/2014 | Kelly | ............... | B60N 2/2866 297/219.12 |
| 8,833,854 B2 * | 9/2014 | Lu | ............... | A47D 1/103 297/253 |
| 8,905,478 B2 * | 12/2014 | Strong | ............... | B60N 2/2806 297/250.1 |
| 2003/0020307 A1 * | 1/2003 | Dunham | ............... | A47D 1/103 297/250.1 |
| 2003/0184138 A1 * | 10/2003 | Haverkamp | ............... | B60N 2/2809 297/254 |
| 2004/0041450 A1 * | 3/2004 | Yamaoka | ............... | B60N 2/2809 297/254 |
| 2005/0225138 A1 * | 10/2005 | Laporte | ............... | B60N 2/2809 297/254 |
| 2008/0136150 A1 * | 6/2008 | Shin | ............... | B60R 21/01556 280/735 |
| 2012/0299337 A1 * | 11/2012 | Miller | ............... | B60N 2/2872 297/148 |
| 2015/0352984 A1 * | 12/2015 | Bailey | ............... | B60N 2/2812 297/250.1 |

* cited by examiner

FIG. 22 ved from the seatback
VEHICLE SEAT STRAP RETAINING ASSEMBLY

BACKGROUND

Field of the Invention

The present invention generally relates to a vehicle seat strap retaining assembly. More specifically, the present invention relates to vehicle seat assembly that includes a concealed frame structure within a seatback section that define a central indentation area along an upper surface of the seatback section such that when a child seat strap extends over the upper surface of the seatback section, the seatback section is compressed in the area of the central indentation area with the central indentation area retaining the child seat strap therein.

Background Information

Vehicle rear seat assemblies are configured to retain a child seat thereon. Some child seats include a strap that is designed to wrap over a top surface of a seatback section of the rear seat assembly and attach to an attachment structure on a rear surface of the seat assembly.

SUMMARY

One object of the disclosure is to provide a strap retaining clip to a rear surface of a seat assembly to retain a retaining strap of a child seat in position relative to the seatback.

In view of the state of the known technology, one aspect of the present disclosure is to provide a vehicle seat strap retaining assembly with a seat cushion section, a seatback section, a strap retaining clip and a strap attachment structure. The seatback section is attached to the seat cushion, the seatback section having a passenger's back supporting surface and an upper end surface. The strap retaining clip is attached to a rear surface of the seatback section. The strap attachment structure is rigidly fixed to one of the seat cushion section and the seatback section beneath the upper end surface. The strap retaining clip and the strap attachment structure are positioned and configured such that with a child seat positioned on the seat cushion section, a securing strap of the child seat extending over the upper end surface of the seatback section passes through the strap retaining clip and attaches to the strap attachment structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
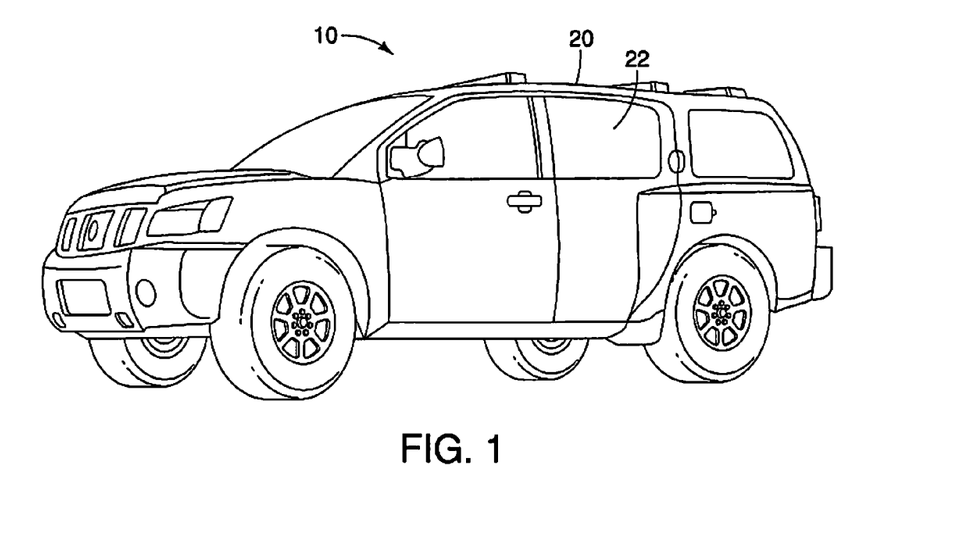
FIG. 1 is a perspective view of a vehicle that includes a rear seat assembly in accordance with a first embodiment.
Figure 2:
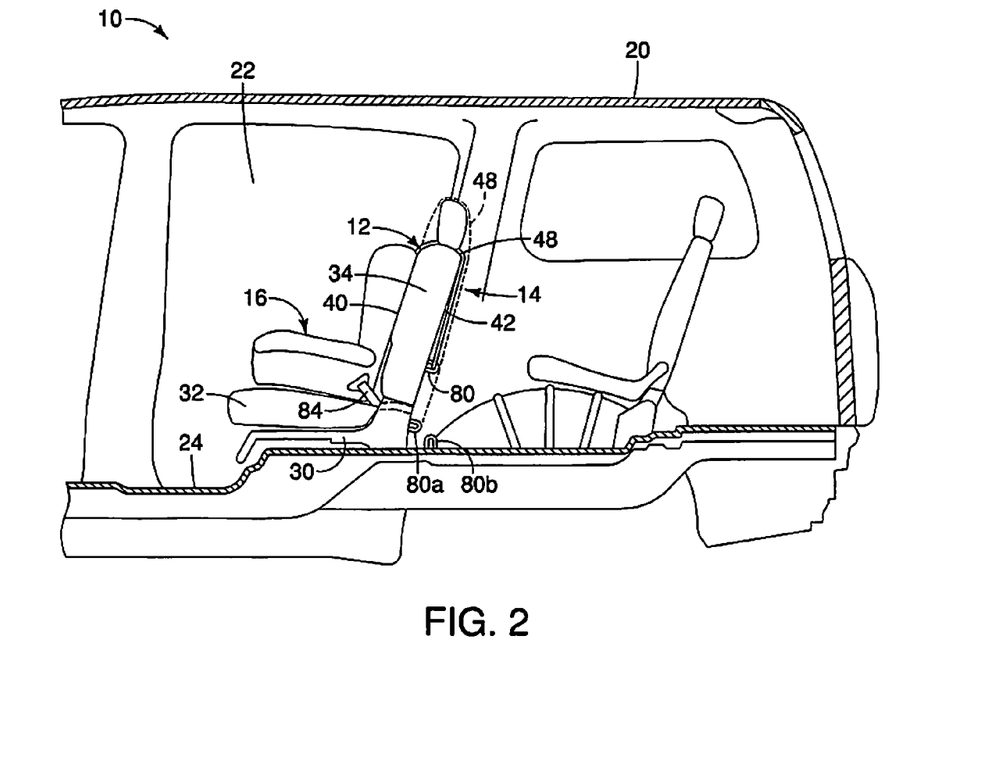
FIG. 2 is a cross-sectional view of the vehicle with the rear seat assembly showing a vehicle seat strap retaining assembly in accordance with a first embodiment.

Referring initially to FIGS. 1 and 2, a vehicle 10 having a seat assembly 12 with a seat strap retaining assembly 14 is illustrated in accordance with a first embodiment.

The vehicle 10 can be any of a variety vehicle designs, such as a two door coupe, a four-door sedan, a truck or a sports utility vehicle (SUV). In the depicted embodiment, the vehicle 10 is an SUV. More specifically, the vehicle 10 can be any vehicle design that includes a rear seat, such as the seat assembly 12, that can receive and support a child seat 16.

The vehicle 10 includes a vehicle body structure 20 that defines a passenger compartment 22 with a floor 24. Since other elements, components and features of the vehicle 10 and vehicle body structure 20 (other than the seat assembly 12 and the seat strap retaining assembly 14) are conventional features, further description is omitted for the sake of brevity.

The seat assembly 12 is a rear seat that includes a support structure 30, a seat cushion section 32 and a seatback section 34. The seat assembly 12 is installed within the passenger compartment 22 in a conventional manner. For example, the support structure 30 can be fixedly attached to the floor 24 via, for example, mechanical fasteners (not shown). In one embodiment, the support structure 30 can include a position adjusting mechanism such as forward and rearward positioning movement (not shown) that can be set by a passenger seated in the seat assembly 12, thereby changing the position of the entire seat assembly 12 relative to the floor 24. In another embodiment, the support structure 30 can be rigidly and non-movably fixed to the floor 24.

The seat cushion section 32 is supported by the support structure 30 in a conventional manner and can include a position adjusting mechanism that raises and lowers the seat cushion section 32 in order to gain access to a space beneath the seat cushion section 32, or to gain access to areas rearward of the seat assembly 12. The seat cushion section 32 is a portion of the seat that is approximately horizontally oriented such that a passenger sits on an upper surface of the seat cushion section 32.

Figure 3:
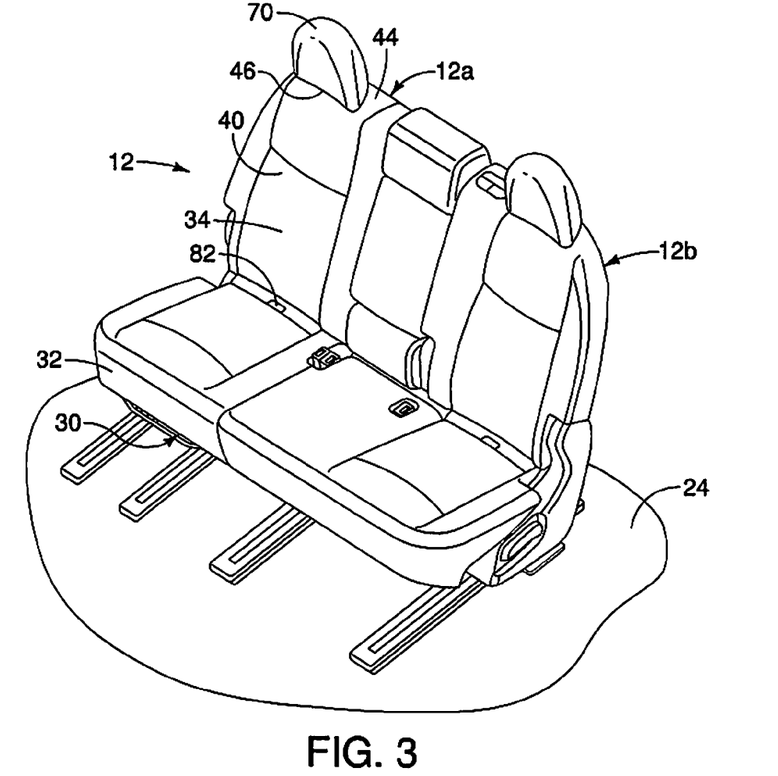
FIG. 3 is a perspective view of the rear seat assembly showing a seat cushion section, a seatback section and a headrest where the seatback section and the headrest include a concealed central indentation areas in accordance with a first embodiment.

The seatback section 34 is supported to one or both of the seat cushion section 32 and the support structure 30 in a conventional manner. Specifically, the seatback section 34 is generally held in an upright orientation as shown in FIGS. 2 and 3, but can incline in a vehicle forward direction in order to gain access to the areas rearward of the seat assembly 12. The seatback section 34 can also be reclined in a vehicle rearward direction so that a passenger seated in the seat assembly 12 can lean back during a long drive for comfort. Since the mechanical structures associated with connections between the floor 24, the support structure 30, the seat cushion section 32 and the seatback section 34 are conventional structures, further description is omitted for the sake of brevity.

As shown in FIG. 3, the seat assembly 12 is divided into a first section 12a and a second section 12b, with the second section 12b being wider than the first section 12a. Specifically, the first section 12a is defines approximately 40% of an overall seating area of the seat assembly 12 and the second section 12b defines approximately 60% of the overall seating area in an arrangement characterized as a 60-40 split. For purposes of describing the features of the seat assembly 12, only the seatback section 34 of the first section 12a is described below. However, it should be understood from the drawings and description herein that the description of the seatback section 34 of the first section 12a below applies equally to both sections of the seat assembly 12.

Figure 4:
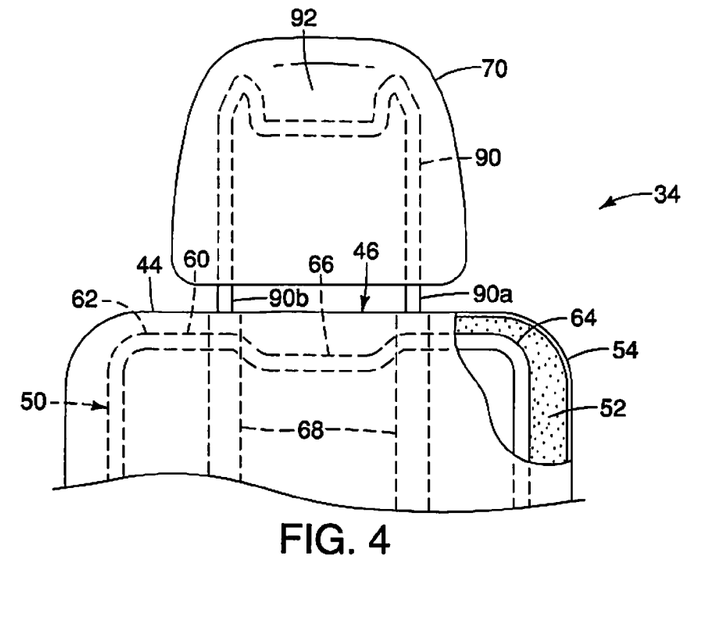
FIG. 4 is a front view of the seatback section of the rear seat assembly showing a frame structure within the seatback section that at least partially defines the central indentation area in accordance with a first embodiment.
Figure 5:
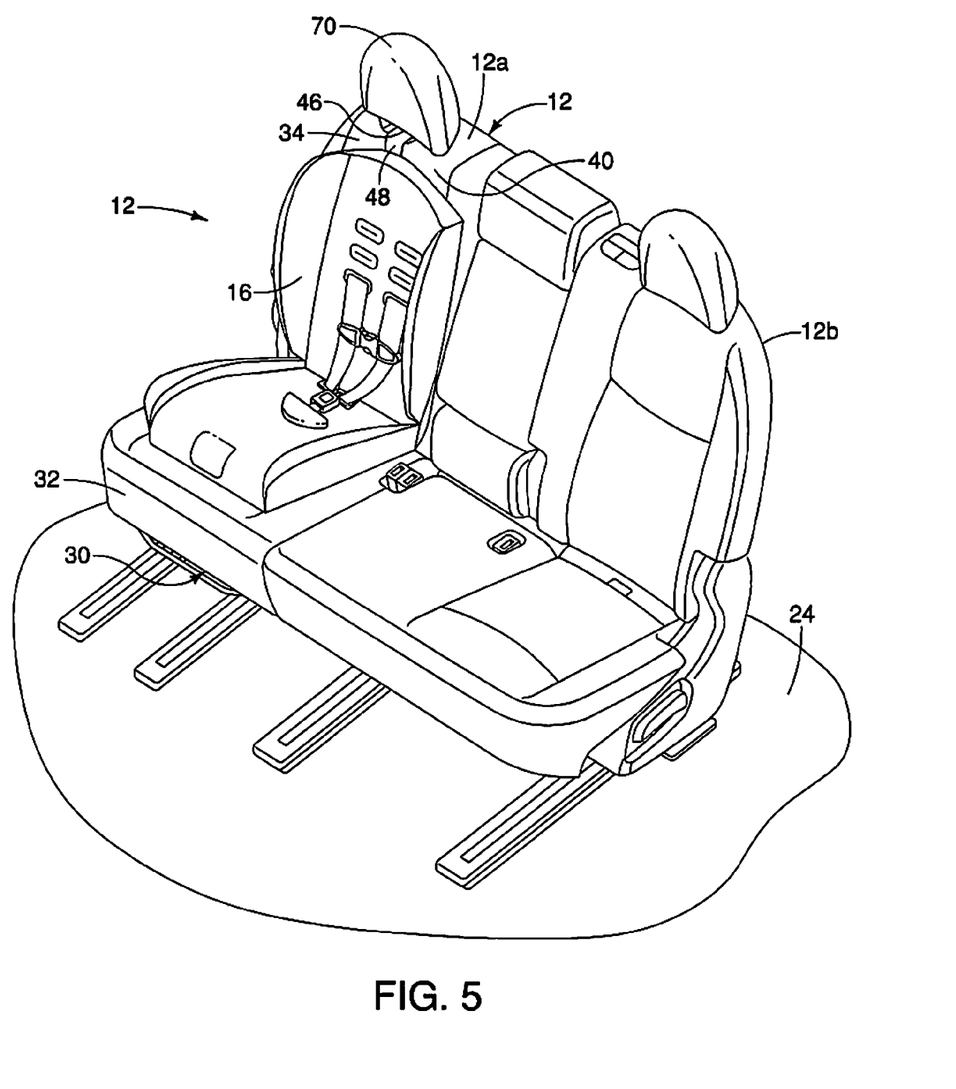
FIG. 5 is another perspective view of the rear seat assembly similar to FIG. 3, showing a child seat installed to the seat cushion section and the seatback section with a first retaining strap extending over the central indentation area, compressing the central indentation area thereby restricting movement of the first retaining strap in accordance with a first embodiment.

A description of the seatback section 34 is now provided with specific reference to FIGS. 2-6. The seatback section 34 has a passenger's back supporting surface 40, a rear surface 42 and an upper end surface 44. The passenger's back supporting surface 40 is a surface designed for supporting the back of a passenger seated in the seat assembly 12. However, as shown in FIG. 5, the seat cushion section 32 and the passenger's back supporting surface 40 of the seatback section 34 can also support the child seat 16. The rear surface 42 extends generally parallel to the passenger's back supporting surface 40 but faces a rearward area of the passenger compartment 22.

The upper end surface 44 at least partially defines a central indentation area 46 configured to receive a first retaining strap 48 (a child seat retaining strap) of the child seat 16 in a manner described in greater detail below.

As shown in FIG. 4, the seatback section 34 includes a frame structure 50, a cushion portion 52 and a cover 54 that overlays the frame structure 50 and the cushion portion 52. The frame structure 50 includes an upper end 60 that includes a first side portion 62, a second side portion 64 that is level with the first side portion 62 and a central portion 66 centered between the first side portion 62 and the second side portion 64. The central portion 66 is vertically lower than the first side portion 62 and the second side portion 64. Hence, the central portion 66 also at least partially defines the central indentation area 46. The frame structure 50 also includes a pair of headrest support cylinders 68 that support a headrest 70 such that the headrest 70 can be raised and lowered relative to the seatback section 34, as described in greater detail below.

Figure 6:
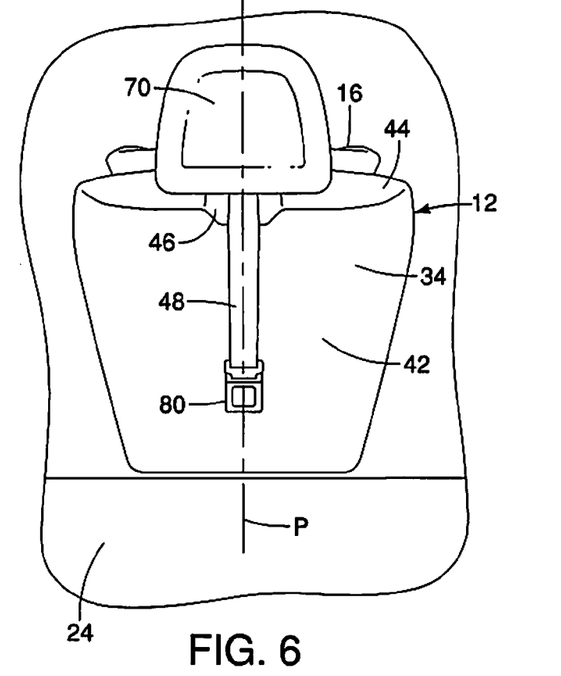
FIG. 6 is a rear view of the seatback section of the rear seat assembly showing the first retaining strap extending downward from the central indentation area and attached to a first strap attachment in accordance with the first embodiment.
Figure 7:
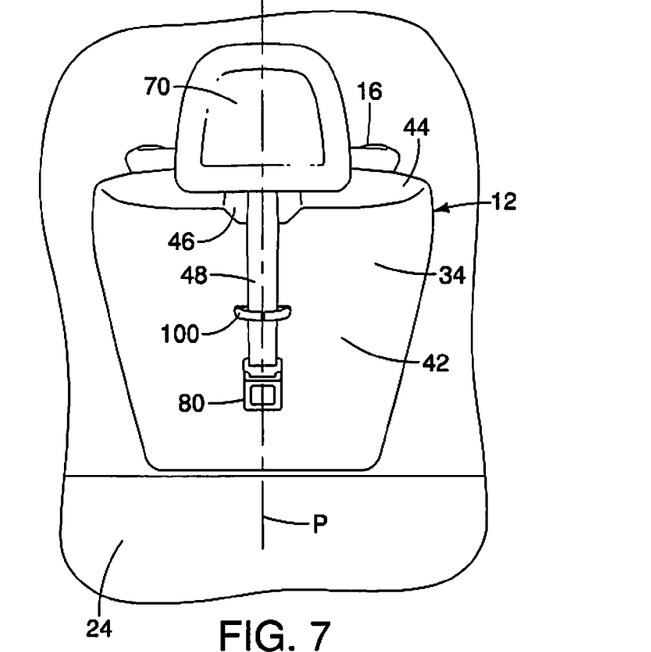
FIG. 7 is a rear view of the seatback section of the rear seat assembly depicted in FIG. 6, showing the first retaining strap extending downward from the central indentation area and passing through a strap retaining clip in accordance with a second embodiment.

The cushion portion 52 is conventional seat cushioning material that is resilient and compressible. Specifically, the cushioning portion 52 can be compressed but has sufficient elastically such that the cushioning portion 52 returns to an uncompressed state after being compressed. Similarly, the cover 54 has elastic properties such that upon experiencing a predetermined amount of stretching, the cover 54 returns to its original shape and state after being stretched. The cushion portion 52 is a layer of material that covers and overlays the frame structure 50. Similarly, the cover 54 is configured and shaped to overlay the frame structure 50. More specifically, the cushion portion 52 and the cover 54 overlay the first side portion 62, the central portion 66 and the second side portion 64 of the frame structure 50. In the area of the central indentation area 46, the cushion portion 52 fills the space between the central portion 66 of the frame structure 50 and the cover 54. When a central area of the upper end surface 44 of the seatback section 34 is pressed downward by, for example, the installation of the first retaining strap 48 of the child seat 16, the cushion portion 52 compresses and the cover 54 stretches slightly, making the central indentation area 46 visible, as shown in FIGS. 5, 6 and 7. When force is removed from the area of the central indentation area 46, the cushion portion 52 resiliently restores is original shape as does the cover 54 and the central indentation area 46 is no longer prominently evident.

A description of the seat strap retaining assembly 14 now provided with specific reference to FIGS. 2-6. The seat strap retaining assembly 14 includes at least a first strap attachment structure 80, a second strap attachment structure 82 and the central indentation area 46 of the seatback section 34. As shown in FIGS. 2 and 6, the first strap attachment structure 80 is fixedly attached to the rear surface 42 of the seatback section 34. In the depicted embodiment, the first strap attachment structure 80 is rigidly and fixedly installed to a lower area of the rear surface 42 of the seatback section 34. However, the first strap attachment structure 80 can be installed adjacent to the upper end surface 44, just below the indentation area 46. Alternatively, a first strap attachment structure 80a can be attached to the support structure 30 of the seat assembly 12 or a first strap attachment structure 80b can be attached to the floor 24 directly behind the seat assembly 12, as indicated in FIG. 2.

The second strap attachment structure 82 is fixedly attached to the seat assembly 12, as shown in FIG. 3. Specifically, the second strap attachment structure 82 located within a space between a bottom edge of the seatback section 34 and the upper surface of the seat cushion section 32.

The seat strap retaining assembly 14 serves as follows. When the child seat 16 is secured within the passenger compartment 22, the first retaining strap 48 is extended over the upper end surface 44 of the seatback section 34, and also over the central indentation area 46 and is secured to the first strap attachment structure 80. The first retaining strap 48 is attached to an upper end of the child seat 16. During installation of the first retaining strap 48, the central indentation area 46 is compressed such that the first retaining strap 48 is located within the indentation along the upper surface of the central portion 66 of the frame structure 50. Further a second retaining strap 84 (FIG. 2) is attached to the second strap attachment structure 82 (shown in FIG. 3) in a conventional manner.

With the first retaining strap 48 within the central indentation area 46 (along the central portion 66 of the upper end 60 of the frame structure 50) of the seatback section 34, lateral movement of the first retaining strap 48 and the upper end of the child seat 16 is prevented, even during an impact event where force is applied from a lateral side of the vehicle 10.

As indicated in FIG. 6, the strap attachment 80 is located adjacent to and beneath the central indentation area 46. The strap attachment 80 is located within a vertically oriented plane P that intersects with the central indentation area 46 of the seatback section 34.

As shown in FIG. 4, the headrest 70 can also include a frame structure 90 that at least partially defines a second central indentation area 92. The frame structure 90 is part of a position adjustment structure of the seatback section 34. Specifically, the frame structure 90 of the headrest 70 extend into the headrest support cylinders 68 within the seatback section 34. Hence, the seatback section 34 of the seat assembly 12 can include both the central indentation area 46 and the second central indentation area 92. For simplicity sake, the headrest 70 and the structure that defines the second central indentation area 92 are described herein below with respect to the third embodiment.

Second Embodiment

Referring now to FIG. 7-10, a seatback section 134 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The seatback section 134 is identical to the seatback section 34 of the first embodiment and includes all of the features of the seatback section 34 of the first embodiment, except that the seatback section 134 of the second embodiment a strap retaining clip 100. Specifically, the strap retaining clip 100 is fixedly and non-movably attached to the rear surface 42 of the seatback section 134 below the central indentation area 46.

Figure 8:
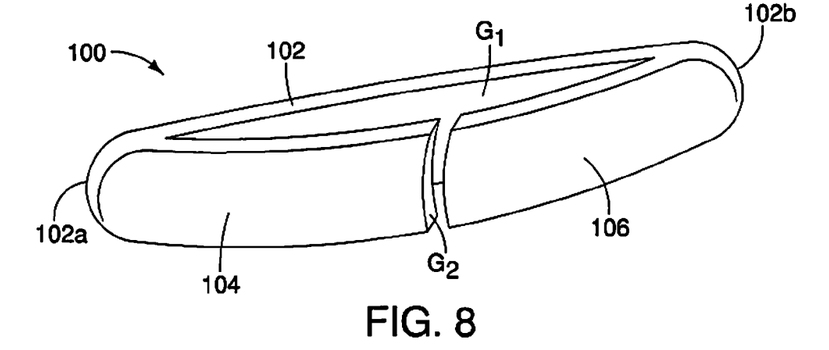
FIG. 8 is a first perspective view of the strap retaining clip depicted in FIG. 7, shown removed from the seatback section in accordance with the second embodiment.
Figure 9:
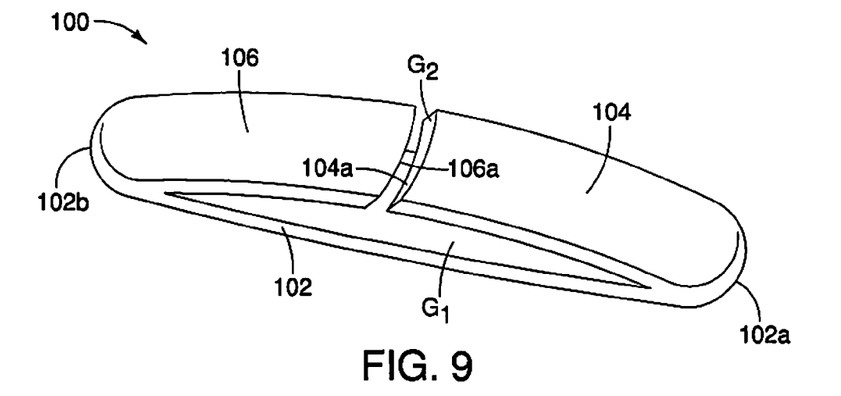
FIG. 9 is a second perspective view of the strap retaining clip depicted in FIGS. 7 and 8, shown removed from the seatback section in accordance with the second embodiment.
Figure 10:
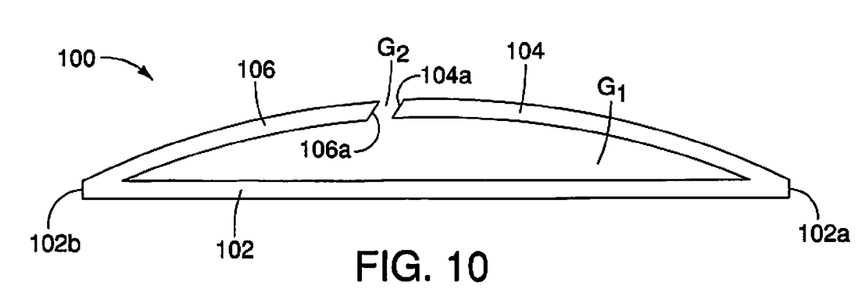
FIG. 10 is a top view of the strap retaining clip depicted in FIGS. 7, 8 and 9, shown removed from the seatback section in accordance with the second embodiment.
Figure 11:
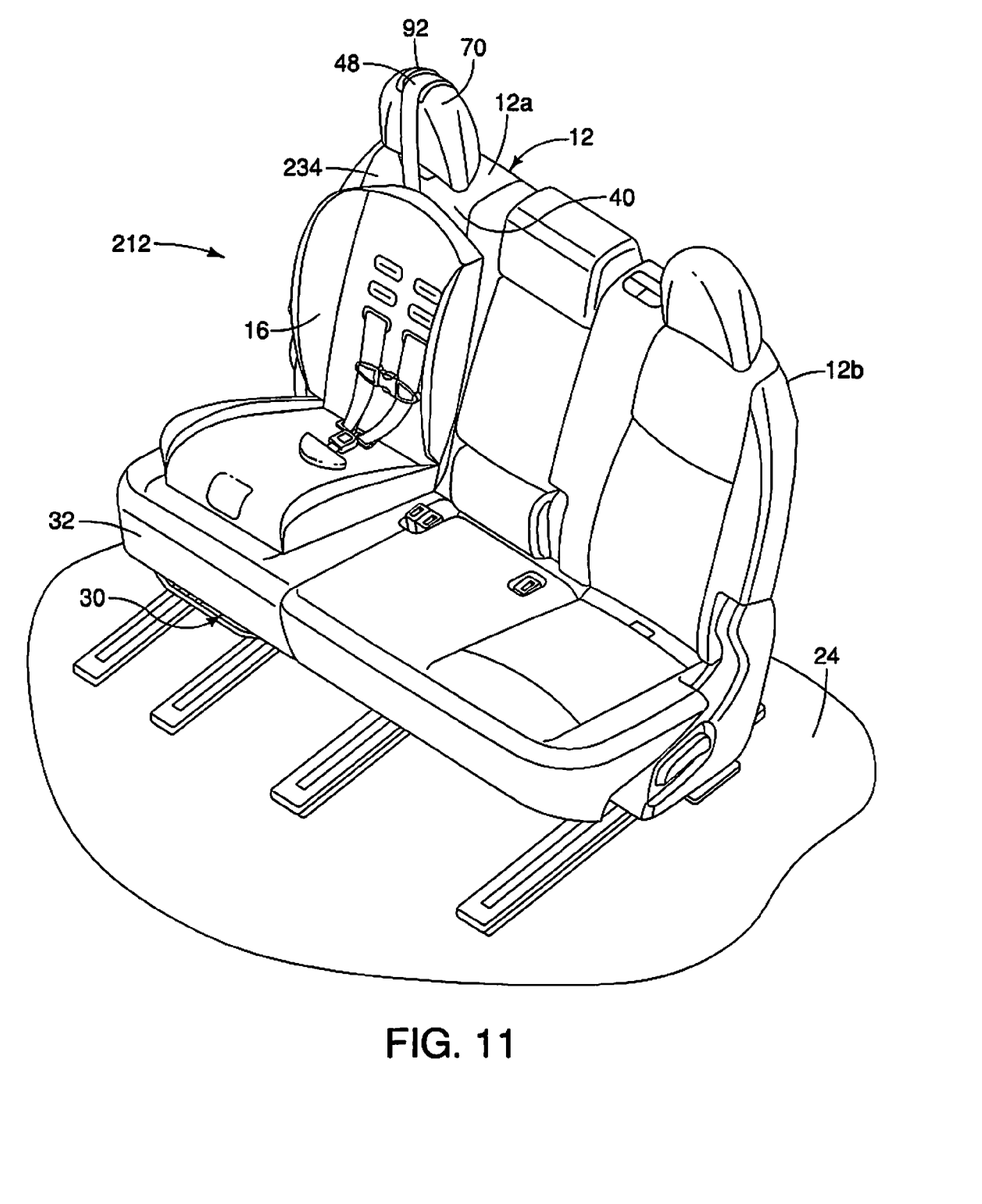
FIG. 11 is a perspective view of a seat assembly having seatback section with a headrest that includes a central indentation area in accordance with a third embodiment.
Figure 12:
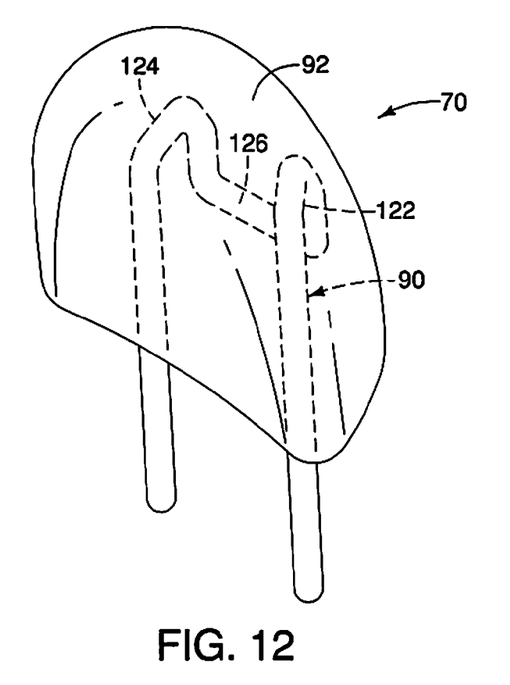
FIG. 12 is a perspective view of the headrest removed from the seatback section showing a frame structure that includes a central portion that at least partially defines a central indentation area in accordance with the third embodiment.
Figure 13:
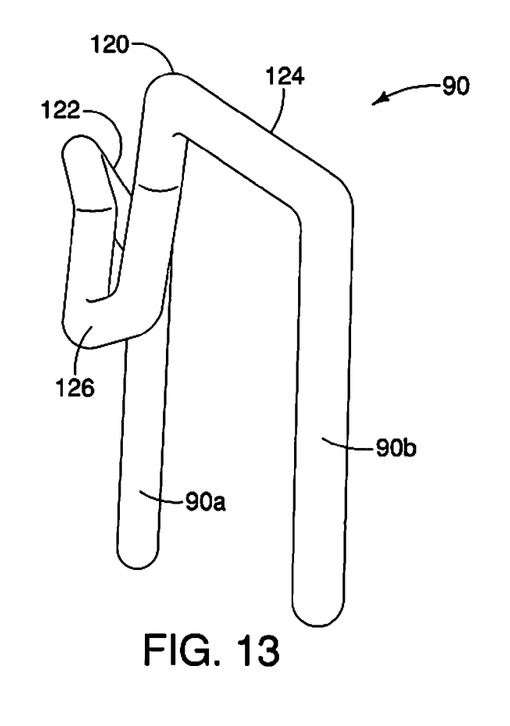
FIG. 13 is a perspective view of the frame structure of the headrest of the seatback section shown removed from the headrest in accordance with the third embodiment.
Figure 14:
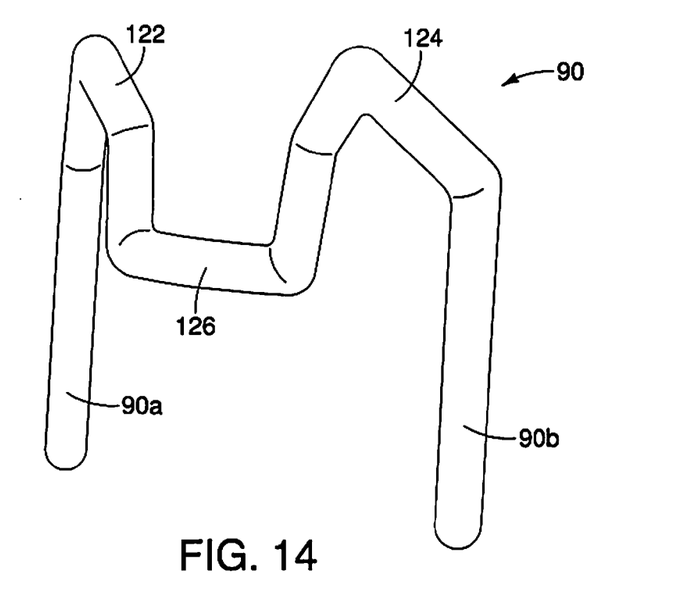
FIG. 14 is another perspective view of the frame structure of the headrest of the seatback section shown removed from the headrest in accordance with the third embodiment.
Figure 15:
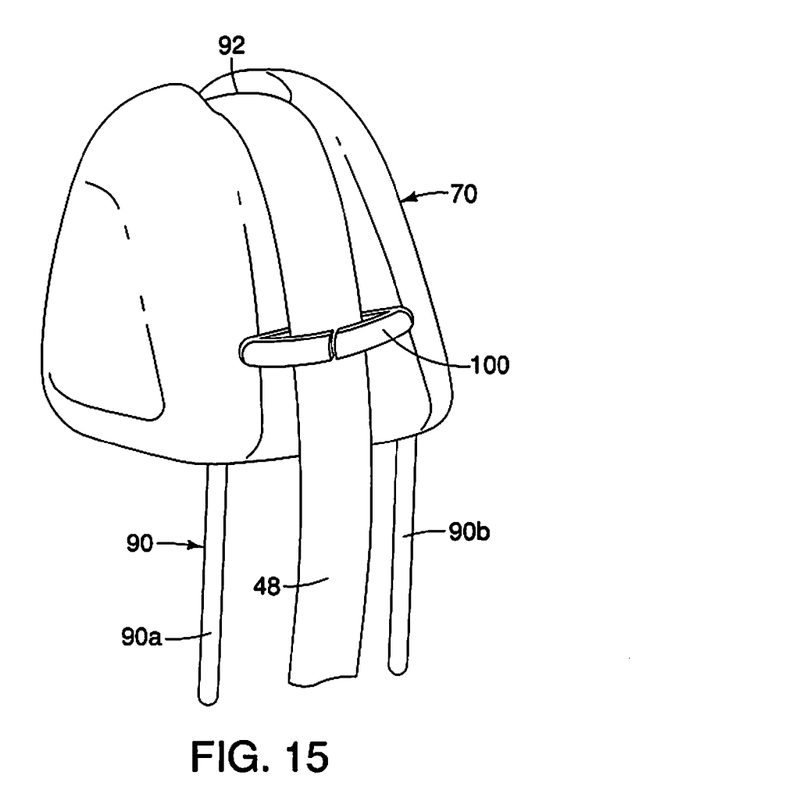
FIG. 15 is a rear perspective view of the headrest depicted in FIGS. 11 and 12, showing a first retaining strap of a child seat extending over the top of the headrest, compressing the central indentation area limiting lateral movement of the first retaining strap in accordance with the third embodiment.
Figure 16:
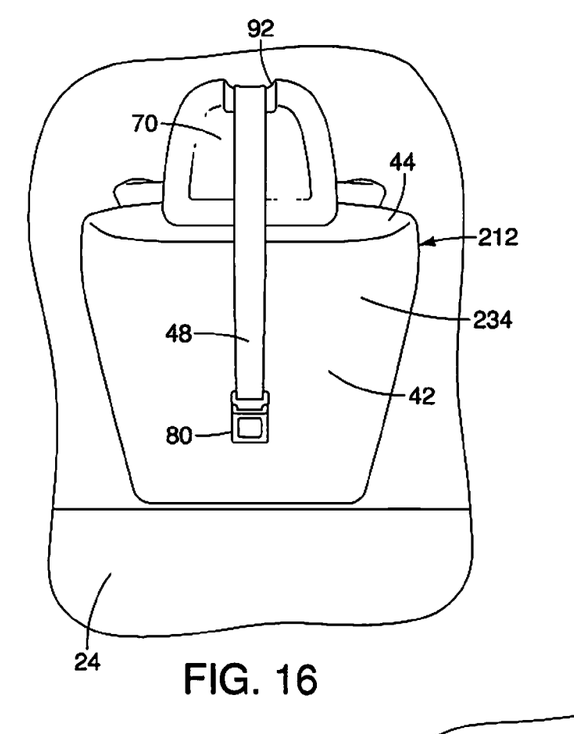
FIG. 16 is a rear view of the seat assembly depicted in FIG. 11, showing the first retaining strap of the child seat extending over the top of the headrest and attaching to a first strap attachment in accordance with the third embodiment.

The strap retaining clip 100 (also referred to as a strap retaining ring) is shown removed from the seatback section 134 in FIGS. 8 and 9. The strap retaining clip includes a base section 102, a first arm 104 and a second arm 106. The base section 102 contacts and is fixed the rear surface 42 of the seatback section 134 by, for example, mechanical fasteners (not shown). The first arm 104 extends from a first end 102a of the base section 102, and the second arm 106 extends from a second end 102b of the base section 102. The first arm 104 and the second arm 106 extend toward one another, such that the base section 102, the first arm 104 and the second arm 106 define a first gap $G_1$ therebetween dimensioned to receive the securing strap of the child seat. The first gap $G_1$ is longer than a width of the first retaining strap 48 such that the first retaining strap 48 can be easily moved through the first gap $G_1$. However, the strap retaining clip 100 prevents or severely limits any possible lateral side-to-side movement of the first retaining strap 48 with the first retaining strap 48 installed within the first gap $G_1$.

Further, a distal end 104a of the first arm 104 and a distal end 106a of the second arm 106 extend toward one another but are spaced apart from one another defining a second gap $G_2$. The second gap $G_2$ is basically a narrow slit dimensioned to allow for easy installation of the first retaining strap 48 through the second gap $G_2$ and into the first gap $G_1$.

Third Embodiment

Referring now to FIGS. 11-16, a seat assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the seat assembly 212 is identical to the seat assembly 12 in that it includes the support structure 30 and the seat cushion section 32. However, the seatback section 34 of the first embodiment is replaced with a seatback section 234 that includes the headrest 70 mentioned above with respect to the first embodiment. The seatback section 234 does not include the central indentation area 46 of the first embodiment. Otherwise, the seatback section 234 is identical to the seatback section 34.

In the third embodiment, the seatback section 234 includes the headrest 70. The headrest 70 includes the central indentation area 92.

The headrest 70 includes the frame structure 90 that at least partially defines the central indentation area 92. Specifically, the frame structure 90 includes upright portions 90a and 90b that are parallel to one another, and insert into the headrest support cylinders 68 of the seatback section 234. The frame structure 90 also includes side portions 122 and 124, and a central portion 126. The side portion 122 extends from the upright portion 90a to the central portion 126, and the side portion 124 extends from the upright portion 90b to the central portion 126. The central portion 126 is located lower than the side portion 122 and 124 relative to a vertical direction thereby at least partially defining the central indentation area 92.

As with the central indentation area 46 of the seatback section 34 of the first embodiment, cushion material and a cover of the headrest 70 compress when the first retaining strap 48 is installed over the headrest 70 such that the retaining strap 48 moves downward into the central indentation area 92 and revealing the central indentation area 92.

With the first retaining strap 48 within the central indentation area 92 of the headrest 70 of the seatback section 234, lateral movement of the first retaining strap 48 and the upper end of the child seat 16 is prevented, even during an impact event where force is applied from a lateral side of the vehicle 10.

It should be understood from the drawings and the description herein that the headrest 70 can be included in the first embodiment with the seatback section 34. Therefore, the seatback section 34 can include the central indentation area 46 along the upper surface 44 of the seatback section 34, and includes the central indentation area 92 of the headrest 70.

However, in the third embodiment, the seatback section 234 does not include structure that defines the central indentation area 46. Therefore, in the third embodiment, the seatback section 234 only includes the central indentation area 92 defined by the headrest 70.

It should also be understood from the drawings and the description herein that the central indentation areas 46 and 92 are basically concealed in the absence of the child seat 16 and are only apparent when the strap 48 contacts respective ones of the central indentation areas 46 and 92, compressing cushion material and covers, such that the strap 48 moves into the respective one of the central indentation areas 46 and 92.

Fourth Embodiment

Figure 17:
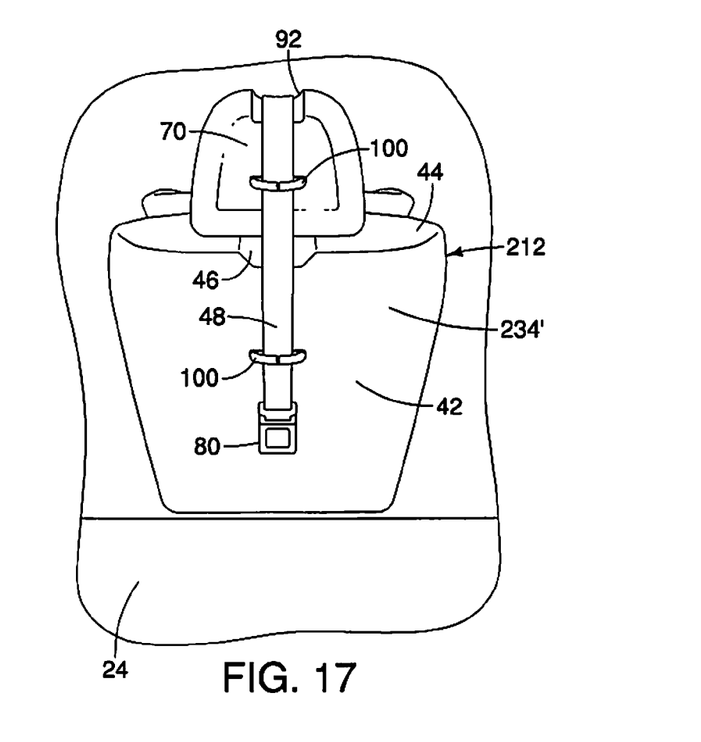
FIG. 17 is a rear view of the seat assembly depicted in FIG. 16, showing the first retaining strap of the child seat extending over the top of the headrest and extending through a strap retaining clip in accordance with a fourth embodiment.

Referring now to FIG. 17, a seatback section 234' of the seat assembly 212 in accordance with a fourth embodiment will now be explained. In view of the similarity between the first, third and fourth embodiments, the parts of the fourth embodiment that are identical to the parts of the first and third embodiments will be given the same reference numerals as the parts of the first and third embodiments. Moreover, the descriptions of the parts of the fourth embodiment that are identical to the parts of the first and/or third embodiments may be omitted for the sake of brevity. The parts of the fourth embodiment that differ from the parts of the first and/or third embodiments will be indicated with a single prime (').

The seatback section 234' is identical to the seatback section 234 except that the seatback section 234' include at least one and optionally two strap retaining clips 100 (described above with respect to FIGS. 8-10). Specifically, one of the strap retaining clips 100 can be installed on the back of the headrest 70 below the central indentation 92. Another strap retaining clip 100 can optionally be installed to the rear surface 42 of the seatback section 234' below the headrest 70.

Fifth Embodiment

Figure 18:
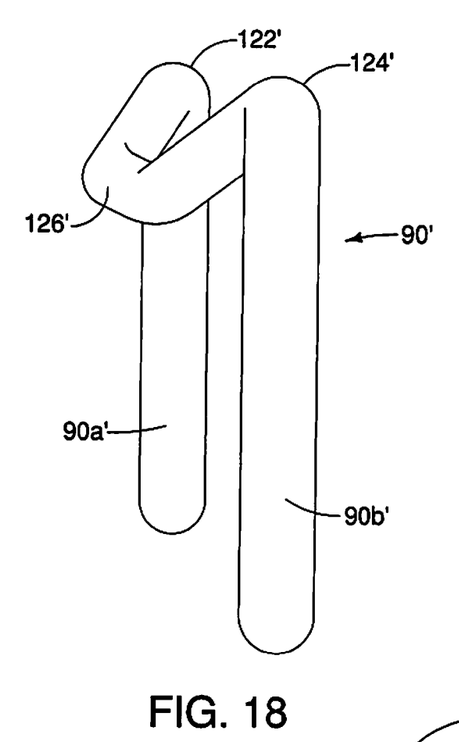
FIG. 18 is a perspective view of a frame structure shown removed from a headrest in accordance with a fifth embodiment.

Referring now to FIG. 18, a frame structure 90' in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a single prime (').

The frame structure 90' is an alternative design that replaces the frame structure 90 of the headrest 70. The frame structure 90' includes upright portions 90a' and 90b' that are parallel to one another. The frame structure 90' also includes side portions 122' and 124', and a central portion 126'. The side portion 122' extends downward from the upright portion 90a' to the central portion 126', and the side portion 124' extends downward from the upright portion 90b' to the central portion 126'. The central portion 126' is lower than upper ends of the side portion 122' and 124' thereby at least partially defining the central indentation area 92.

Sixth Embodiment

Figure 19:
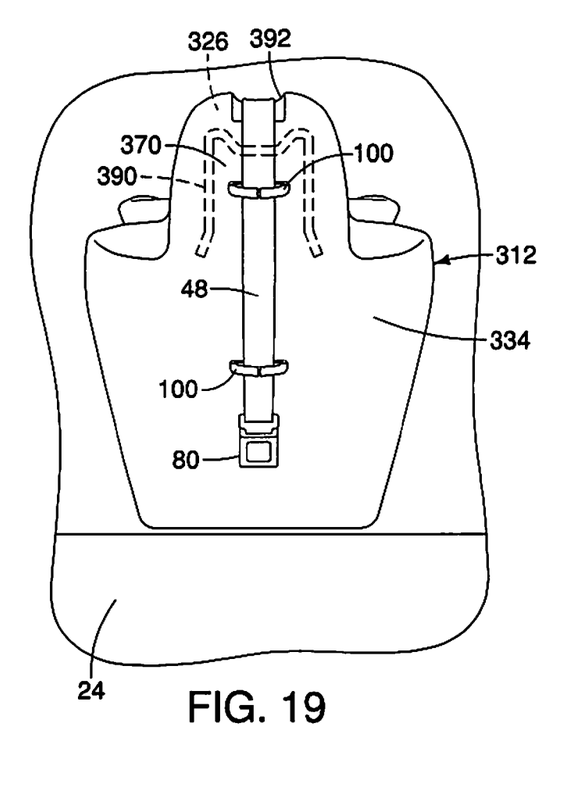
FIG. 19 is a rear view of a seat assembly with a seatback section having an integrally formed headrest section that defines a central indentation area in accordance with a sixth embodiment.
Figure 20:
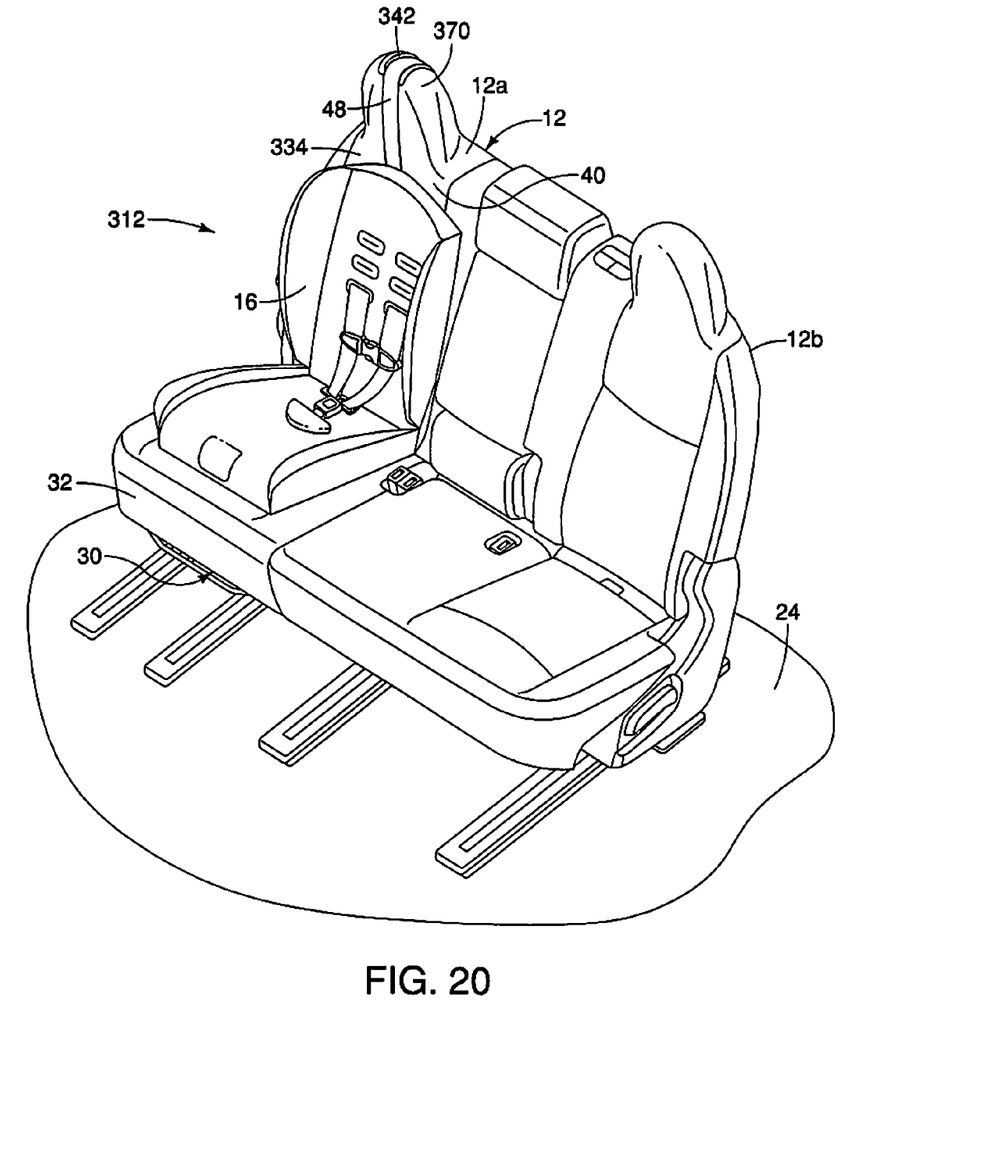
FIG. 20 is a perspective view of the seat assembly depicted in FIG. 19, showing a child seat installed to a seat cushion section and the seatback section with a first retaining strap extending over the central indentation area of the integrally formed headrest, compressing the central indentation area thereby restricting movement of the first retaining strap in accordance with the sixth embodiment.

Referring now to FIGS. 19-20, a seat assembly 312 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The seat assembly 312 includes the seat support structure 30 and the seat cushion section 32 of the seat assembly 12 of the first embodiment. However, in the sixth embodiment, the seat assembly 312 includes a seatback section 334 that replaces the seatback section 34 of the first embodiment. In the sixth embodiment, the seatback section 334 includes a headrest section 370 that is built into the seatback section 334 (integrally formed) such that the headrest section 370 is non-movable relative to the remainder of the seatback section 334. Further, a frame structure 390 of the seatback section 334 extends upward into the headrest section 370 and includes a lowered central portion 326 that at least partially defines a central indentation area 392. The central indentation area 392 serves the same purpose as that of the central indentation area 46 and the central indentation area 92 of the first and third embodiments.

Seventh Embodiment

Figure 21:
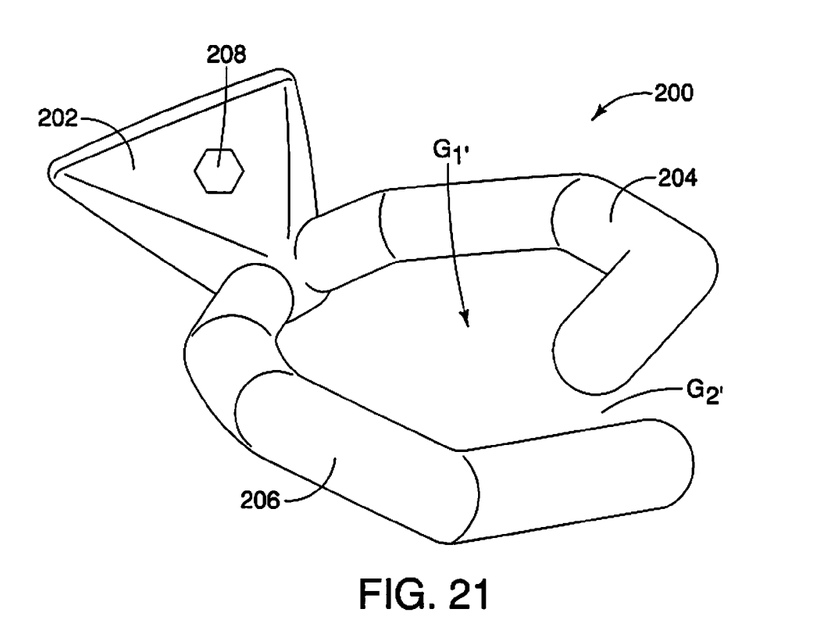
FIG. 21 is a perspective view of a strap retaining clip in accordance with a seventh embodiment.
Figure 22:
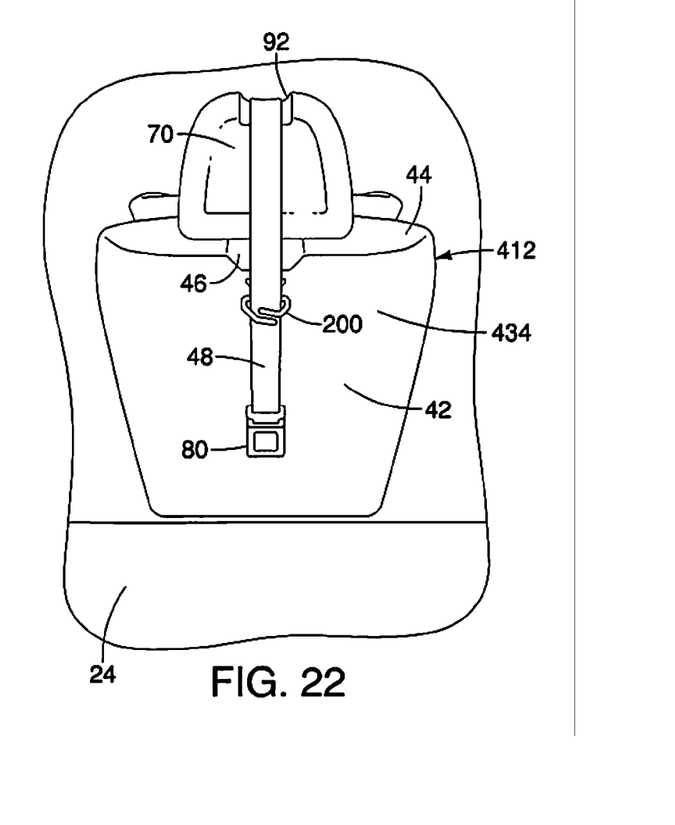
FIG. 22 is a rear view of a seatback section of a rear seat assembly showing a first retaining strap extending downward from the central indentation area and passing through the strap retaining clip in accordance with the seventh embodiment.

Referring now to FIGS. 21-22, a strap retaining clip 200 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity. The parts of the seventh embodiment that differ from the parts of the first embodiment will be indicated with a single prime (').

The strap retaining clip 200 includes a base portion 202, a first arm 204 and a second arm 206. The base portion 202 includes an attachment point 208 that can include a pivot shaft that installed to a rear surface 42 of a seatback section 434 of a seat assembly 412. The seat assembly 412 is identical to the seat assembly 12 of the first embodiment except that the strap retaining clip 200 is being employed.

The first arm 204 has an overall arcuate shape such that the first arm 204 initially curves away from the second arm 206 moving away from the base 202, but then curves around toward the second arm 206. The second arm 206 similarly initially curves away from the first arm 204 moving away from the base 202 and then curves back toward the first arm 204. Distal ends of the first and second arms 204 and 206 are spaced apart from one another with the distal end of the first arm 204 being located above the distal end of the second arm 206. The shapes of the first arm 204 and the second arm 206 are such that a first gap $G_1$, is defined therebetween. Further a second gap $G_2$, defined between the distal ends of the first arm 204 and the second arm 206.

Hence, the strap retaining clip 200 can function in a manner consist with the strap retaining clamp 100 described above.

The various seat elements (other than the structures that define the central indentation areas 46, 92 and 392) are conventional components that are well known in the art. Since such seat elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat strap retaining assembly. Accordingly, these terms, as utilized to describe the present invention should be interpreted relative to a vehicle equipped with the vehicle seat strap retaining assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seat strap retaining assembly comprising:
   a seat cushion section;
   a seatback section attached to the seat cushion, the seatback section having a passenger's back supporting surface and an upper end surface;
   a strap retaining clip attached to a rear surface of the seatback section; and
   a strap attachment structure rigidly fixed to a rear surface of one of the seat cushion section and the seatback section beneath the upper end surface and the strap retaining clip, the strap retaining clip and the strap attachment structure being positioned such that in response to a child seat being positioned on the seat cushion section with a securing strap of the child seat extending over the upper end surface of the seatback section passing through the strap retaining clip and attaching to the strap attachment structure, the strap retaining clip is configured to center the securing strap relative to the seatback section and restrict lateral movement of the securing strap and the child seat.

2. The vehicle seat assembly according to claim 1, wherein
   the seatback section includes a headrest assembly that at least partially defines the upper surface of the seatback section.

3. The vehicle seat assembly according to claim 2, wherein
   the strap retaining clip is installed to the headrest assembly of the seatback section.

4. The vehicle seat assembly according to claim 2, wherein
   the strap retaining clip is installed to the seatback section below the headrest assembly.

5. The vehicle seat assembly according to claim 1, wherein
   the seatback section includes a headrest portion integrally formed with the seatback section that at least partially defines the upper surface of the seatback section.

6. The vehicle seat assembly according to claim 5, wherein
   the strap retaining clip is installed to the headrest portion of the seatback section.

7. The vehicle seat assembly according to claim 5, wherein
   the strap retaining clip is installed to the seatback section below the headrest portion of the seatback section.

8. The vehicle seat assembly according to claim 1, wherein the strap retaining clip includes a base section, a first arm and a second arm, the base section contacting the rear surface of the seat back section, the first arm extending from a first end of the base section, and the second arm extending from a second end of the base section, the first arm and the second arm extending toward one another, such that the base section, the first arm and the second arm define a gap therebetween dimensioned to receive the securing strap of the child seat.

9. The vehicle seat assembly according to claim 1, wherein
the upper surface of the seatback section includes a central indentation area configured to receive a child seat securing strap of the child seat.

10. The vehicle seat assembly according to claim 9, wherein
the seatback section includes headrest supporting structures within the seatback section located at opposite sides of the central indentation area, and
a headrest assembly that includes attachment rods insertable into respective ones of the headrest supporting structures.

11. The vehicle seat assembly according to claim 10, wherein
the headrest assembly includes a second central indentation area located directly above the central indentation area of the seatback section intersecting the vertical plane.

12. The vehicle seat assembly according to claim 9, wherein
the seatback section includes headrest supporting structures within the seatback section located at opposite sides of the central indentation area, and
a headrest assembly that includes attachment rods insertable into respective ones of the headrest supporting structures, an upper surface of the headrest assembly defining the central indentation area.

13. The vehicle seat assembly according to claim 12, wherein
the headrest assembly includes a frame structure, a cushion portion and a cover that overlays the frame structure and the cushion portion, the frame structure having an upper end that includes a first side portion, a second side portion that is level with the first side portion and a central portion centered between the first side portion and the second side portion, the central portion being vertically lower than the first side portion and the second side portion defining the central indentation area.

14. The vehicle seat assembly according to claim 12, wherein
the seatback section includes an upwardly extending headrest portion integrally and non-movably formed with the seatback section, the headrest portion defining the central indentation area.

15. The vehicle seat assembly according to claim 9, wherein
the headrest portion of the seatback section includes a frame structure, a cushion portion and a cover that overlays the frame structure and the cushion portion, the frame structure having an upper end that includes a first side portion, a second side portion that is level with the first side portion and a central portion centered between the first side portion and the second side portion, the central portion being vertically lower than the first side portion and the second side portion defining the central indentation area.

16. The vehicle seat assembly according to claim 15, wherein
the strap attachment structure and the strap retaining clip are positioned such that a vertical plane extending in a vehicle longitudinal direction of the vehicle body structure intersects both the strap attachment structure and the strap retaining ring.

17. The vehicle seat assembly according to claim 1, wherein
the strap retaining clip includes a base section, a first arm and a second arm, the first arm having an overall curved shape extending in a direction away from the second arm at the base section and curving back around toward the second arm, the second arm having an overall curved shape extending in a direction away from the first arm at the base section and curving back around toward the first arm, with a distal end of the first arm being located above the distal end of the second arm, the first arm and the second arm define a gap therebetween dimensioned to receive the securing strap of the child seat.

18. The vehicle seat assembly according to claim 17, wherein
the base section includes a pivoting structure such that the base section pivots relative to the seatback section.

* * * * *